United States Patent [19]

Kameoka et al.

[11] Patent Number: 5,714,230
[45] Date of Patent: Feb. 3, 1998

[54] DEGRADABLE ALIPHATIC POLYESTER FORMED PRODUCTS

[75] Inventors: Taiji Kameoka; Takeshi Kashima; Masanobu Ajioka; Akihiro Yamaguchi; Kazuhiko Suzuki, all of Kanagawa, Japan

[73] Assignee: Mitsui Toatsu Chemicals, Inc., Tokyo, Japan

[21] Appl. No.: 340,902

[22] Filed: Nov. 15, 1994

[30] Foreign Application Priority Data

| Nov. 18, 1993 | [JP] | Japan | 5-288911 |
| Dec. 17, 1993 | [JP] | Japan | 5-317808 |
| Dec. 17, 1993 | [JP] | Japan | 5-317809 |
| Dec. 20, 1993 | [JP] | Japan | 5-319488 |
| Dec. 20, 1993 | [JP] | Japan | 5-319490 |
| Dec. 21, 1993 | [JP] | Japan | 5-321721 |
| Dec. 28, 1993 | [JP] | Japan | 5-335508 |

[51] Int. Cl.$^6$ ................... B32B 00/00; D06N 7/04
[52] U.S. Cl. ................... 428/141; 528/272; 528/274; 524/700; 428/141; 428/221; 428/364; 521/50; 521/138
[58] Field of Search ................... 528/272, 274; 524/700; 428/141, 321, 364; 521/50, 138

[56] References Cited

U.S. PATENT DOCUMENTS

| 3,850,862 | 11/1974 | Clendinning et al. | 523/128 |
| 3,932,319 | 1/1976 | Clendinning et al. | 47/66 |
| 4,554,343 | 11/1985 | Jackson, Jr. et al. | |
| 5,128,439 | 7/1992 | Sartori et al. | |
| 5,310,865 | 5/1994 | Enomoto et al. | 528/361 |
| 5,401,796 | 3/1995 | Kashima et al. | 524/706 |
| 5,496,923 | 3/1996 | Suizu et al. | 528/501 |
| 5,616,657 | 4/1997 | Imamura et al. | 525/437 |

FOREIGN PATENT DOCUMENTS

| 0618249 | 10/1994 | European Pat. Off. |
| 1533082 | 11/1968 | France |
| 2352013 | 12/1977 | France |
| 59-88961 | 5/1984 | Japan |
| 59-94658 | 5/1984 | Japan |
| 59-94660 | 5/1984 | Japan |
| 92-38784 | 3/1985 | Japan |
| 63-227812 | 9/1988 | Japan |
| 63-317032 | 12/1988 | Japan |
| 4-189822 | 7/1992 | Japan |
| 4-336246 | 11/1992 | Japan |
| 51-5736 | 4/1993 | Japan |
| 51-40284 | 6/1993 | Japan |
| 51-40285 | 6/1993 | Japan |
| 51-40286 | 6/1993 | Japan |
| 51-40288 | 6/1993 | Japan |
| 51-407287 | 6/1993 | Japan |

*Primary Examiner*—Samuel A. Acquah
*Attorney, Agent, or Firm*—Burns, Doane, Swecker & Mathis

[57] ABSTRACT

Formed products such as foams, fabrics for industrial materials, filaments, nonwoven fabrics, composite materials and films which are degradable after use with ease in the natural environment are prepared by using a high molecular weight aliphatic polyester obtained by direct polycondensation of an aliphatic polyhydric alcohol with aliphatic polybasic acid or additionally hydroxycarboxylic acid or oligomers of these materials in a reaction mixture containing a solvent.

Foams have excellent thermal insulation and strength; fabrics are excellent in thermal insulation, strength and elongation and can be used for industrial materials; filaments have sufficient strength, flexibility and degradability in a living body and can be used for bioabsorbable surgical filament and fishing lines; nonwoven fabrics can be obtained by bonding a web of filaments and have excellent strength and feeling; composite materials can be prepared by adhering or impregnating fiber, paper, film and others of cellulosics and have excellent strength and water resistance, good flexibility and folding resistance, simultaneously have degradability in the natural environment, and can dissolve polymer films on the surface with ease under alkaline conditions to recover cellulosics alone; and films are excellent in heat resistance and strength.

4 Claims, No Drawings

DEGRADABLE ALIPHATIC POLYESTER FORMED PRODUCTS

BACKGROUND OF THE INVENTION

1. Field of the Invention

The present invention relates to a degradable aliphatic polyester formed product and more particularly relates to a degradable foam, fabric for an industrial material, filament, nonwoven fabric, composite material, film and other formed product which comprises a thermoplastic polymer composition having an aliphatic polyester as a main component and which can be degraded after use in the natural environment with ease.

2. Description of the Related Art

Conventionally, formed product such as foams, fabrics for industrial materials, filaments, decomposable nonwoven fabrics, composite materials and films have been prepared from polyolefin, polyurethane, polyamide and other resins. These formed products, however, have a very slow rate of decomposition in the natural environment and semipermanently remain under the ground when buried for disposal. Further, abandoned plastics lead to problems by impairing the aesthetics or destroying the living environment of marine organisms. When the refuse is disposed by incineration, toxic gases develop and cause destruction of the environment on earth and additionally lead to problems by accelerating deterioration of incinerators.

Foams have been widely applied to thermal insulation materials and shock absorbers. These foams can be prepared from a small amount of resin and thus are utilized for light weight and cheap containers of food, thermal insulation materials and shock absorbers. However, forms prepared from these resins are bulky and increase the amount of refuse when they are abandoned after use.

Conventional fabrics also cause similar problems, though excellent as an industrial material.

As to bioabsorbable surgical filaments, conventionally, mainstream cat gut prepared by dividing and purifying small intestine tissue of a cow and successively polishing into the form of fishing strings have drawbacks of rapid decrease of tensile strength retention in a body and also of great difference depending upon the patient's rate of absorption into the body. Thus, conventional cat guts are being replaced by synthetic filaments.

A silk thread hydrolyzes after the lapse of a long period in a living body and is used for a suture portion which requires decomposition in a living body, for example, in the case of sutures for intestines. A silk thread, however, is deficient in strength and thus synthetic filaments are also replacing silk thread.

Synthetic filaments prepared from polyglycolic acid are most frequently used for absorbable surgical sutures, and Opeporix, Dexon and Medifit in which polyglycolic acid is used as a base material are in the market. However, polyglycolic acid sutures are applied in the form of a multifilament because polyglycolic acid homopolymer has high stiffness. Polyglactin 910® (product of Ethicon Co.) is a copolymer of glycolide and lactide and available in the market also in the form of a multifilament due to the same reason.

On the other hand, a suture based on a copolymer of polydioxanone and glycolide is characterized by softness and a slow rate of decomposition in a living body. Additionally, the suture is elastic and is in the market in the form of a monofilament. However, the synthetic filaments mentioned above have problems of very high prices.

As to fishing lines, synthetic filaments of polyamide such as nylon 6 and of polyester such as polyethylene terephthalate are now used. These fishing lines require high strength and long life and thus synthetic filaments having such characteristics have been developed. For example, polyamide or aromatic polyester filaments have been disclosed in Japanese Laid-Open Patent SHO 63-227812 and 63-317032, respectively. Consequently, any of these fishing lines can semipermanently maintain high strength even in water so that polymers or metals which are quite or almost non degradable in water have been used for the raw material.

In recent years, however, fishing tackle which was abandoned or left to stand in the sea, rivers, lakes and marshes has led to problems for the harmful effect on the nature such as impairment of natural environment and injury to birds and aquatic organisms. For example, fishing lines and fitted fishhooks which were abandoned or left to stand in water due to some reasons such being snagged on a rock or stake have been known to cause trouble in navigation of a ship by wrapping themselves around a screw of the ship or to give considerably adverse effect on the ecological system by coiling around birds and aquatic organisms. These subjects have become a serious social problem with increase in the fishing population.

The term "nonwoven fabrics" means a cloth like matter prepared without weaving or knitting, and more particularly means a cloth like matter obtained by bonding or intertwining constitutional filaments of a web composed of fibrous substance without applying weaving or knitting. Conventionally, nonwoven fabrics have been widely used for the center layers of garments, carpets, diapers, sanitary articles and industrial materials. Fibrous materials which constitute nonwoven fabrics are polyolefins such as polypropylene, aromatic polyesters such as polyethylene terephthalate (PET), polybutylene terephthalate (PBT), polyamides such as nylon and cellulosics such as rayon. Nonwoven fabrics prepared from these polymers and preparation processes thereof have been disclosed, for example, in Japanese Laid-Open Patent SHO 59-88961, 59-94658 and 59-94660.

Conventional packaging containers are prepared by using a composite material composed of a polyolefin resin such as polyethylene or polypropylene and a paper or a regenerated cellulose film (cellophane), and widely used for water-resistant packaging containers for packing milk and juice. Coated papers having a smooth and glossy surface are frequently used for book covers and toiletry boxes in order to satisfy the aesthetic desire of consumers. However, in the case of recycling paper as pulp resources, films inhibit the disaggregation step of pulp and decrease efficiency. Further, splinters of the polymer are liable to contaminate the recovered pulp and thus a technique for isolating the polymer from macerated pulp is also needed.

Japanese Laid-Open, Patent HEI 4-336246 has disclosed a laminated material prepared from polylactic acid and paper which is degradable in the natural environment Japanese Laid-Open Patent HEI 5-38784 has also disclosed a composite film of polylactic acid and a regenerated cellulose film. Polylactic acid, however, is a rigid polymer having low elongation and thus paper or a regenerated cellulose film laminated with the polymer is liable to develop cracks due to breakage of the polymer film in the case folding the laminate. Barrier properties against liquid, gas and microorganisms are important in order to use such a composite film as a container for preserving milk, juice and cakes. Generation of cracks by folding is unfavorable.

Films prepared from conventional polymers are excellent packaging materials. These films, however, lead to the above various problems.

An aliphatic polyester had been known as a thermoplastic and degradable polymer. The esterification reaction of polyhydric alcohol and polybasic acid is a successive reaction and the molecular weight of the formed polymer increases with reaction time. However, water generated in the reaction reduces the molecular weight of the polycondensate by hydrolysis. Consequently, it has been thought that an aliphatic polyester obtained by direct polycondensation has a maximum molecular weight of about 10,000.

Japanese Laid-Open Patents HEI 4-189822, 4-189823, 5-105736, 5-140284, 5-140285, 5-140286, 5-140287 and 5-140288 have described a preparation process of a high molecular weight polyester by adding diisocyanate at a NCO/OH equivalent ratio of 1/10-2 to saturated polyester wherein the number average molecular weight is 5,000 or more, terminal groups are substantially hydroxyl and the acid component is a compound having 3 and more carbon atoms or a mixture thereof, in a molten state above the melting point of said saturated polyester. However, isocyanate used as a raw material of high polymers generates strongly toxic diamine in the course of polymer degradation and the diamine accumulates under the ground. When such polymer is used for a packaging material of foodstuffs, diamine generated by decomposition is liable to contaminate the content.

Japanese Laid-Open Patent HEI 5-310898 has disclosed a preparation process of a high molecular weight aliphatic polyester comprising conducting esterification of a glycol component with an aliphatic or alicyclic dicarboxylic acid component or an acid anhydride component thereof and subjecting the resultant polyesterdiol to deglycolation at 180°-230° C. under high vacuum of 0.005-0.1 mm Hg in the presence of a catalyst.

U.S. Pat. Nos. 3,850,862 and 3,932,319 have described a preparation process of aliphatic polyester having an reduced viscosity of 0.1-10 by polymerizing at 250° C. or more under high vacuum of 1 mm Hg or less and successively conducting an ester exchange reaction under extra-high vacuum of $10^{-3}$ mm Hg or less, and a novel mixture obtained by adding a natural biodegradation product to said aliphatic polyester. However, the synthetic process of aliphatic polyester by reacting at such a high temperature inevitably leads to generation of impurities and resultant coloration.

An aliphatic polyester undergoes hydrolysis with relative ease in the presence of water and can also by decomposed by microorganisms, and thus can be applied to the above uses. However, foams, fabrics, filaments, composites with cellulosics and films have not yet been known concerning the aliphatic polyester.

SUMMARY OF THE INVENTION

The object of the invention is to provide a formed product of a thermoplastic degradable polymer which is prepared by a direct condensation of a polyhydric alcohol and a polybasic acid or additionally a hydroxycarboxylic acid and can be decomposed with ease in the natural environment so as to overcome the defects of conventional technology.

Another object of the invention is to provide a foam of the above polymer.

A further object of the invention is to provide a fabric of the above polymer which can be used as an industrial material.

A still further object of the invention is to provide a novel filament of the above polymer which has a satisfactory tensile strength, flexibility, bioabsorbability and degradability and generates no decomposition product tending to exhibit toxicity.

A still further object of the invention is to provide a nonwoven fabric of the above polymer.

A still further object of the invention is to provide a composite material of cellulosic and the above polymer.

A still further object of the invention is to provide a film of the above polymer which can be used for a packaging material.

As a result of an intensive investigation in order to solve the above problems, the present inventors have found that a formed product of an aliphatic polyester resin such as a foam, filament, fabric, nonwoven fabric and film can be obtained by using a high molecular weight aliphatic polyester which is prepared by a direct polycondensation reaction of an aliphatic polyhydric alcohol or a mixture thereof with an aliphatic polybasic acid or a mixture thereof or additionally an aliphatic hydroxycarboxylic acid or a mixture thereof, or an oligomer thereof, in a reaction mixture including an organic solvent. Thus the present invention has been completed.

The present inventors have also found that a composite material having excellent strength and water resistance, good flexibility and folding ability, and degradability in the natural environment can be obtained by adhering or impregnating a resin having the above aliphatic polyester as a main component to fiber, paper or films comprised of cellulosics, that a composite material having good surface gloss and beautiful appearance can be obtained by forming a film of aliphatic polyester of the invention on the surface of a sheet stock comprised of cellulosics, and that the film on the surface of these composite materials can be dissolved with ease under alkaline conditions and the portion of cellulosics alone can be recovered.

That is, one aspect of the invention is a degradable thermoplastic polymer formed product, such as a foam, fabric for an industrial material, filament, nonwoven fabric and film, comprising an aliphatic polyester having a molecular weight of 50,000 or more which is obtained by conducting a direct polycondensation reaction of an aliphatic polyhydric alcohol or a mixture thereof with an aliphatic polybasic acid or a mixture thereof, or additionally a hydroxycarboxylic acid or a mixture thereof, or an oligomer resulting from these raw materials, in a reaction mixture comprising an organic solvent.

Another aspect of the invention is a degradable composite material comprised of a cellulosic and a thermoplastic polymer composition consisting essentially of thermoplastic polyester having a molecular weight of 15,000 or more and being obtained by conducting a direct polycondensation reaction of an aliphatic polyhydric alcohol or a mixture thereof with an aliphatic polybasic acid or a mixture thereof, or additionally a hydroxycarboxylic acid or a mixture thereof, or an oligomer resulting from these raw materials, in a reaction mixture comprising an organic solvent. The foam obtained in the invention can be processed into sheets and used for a soft shock absorbing material, packaging material and food container or can be used for a thermal insulating material and shock absorbing material in the form of a bulk material.

The fabric obtained in the invention can be used as an industrial material.

The filament obtained in the invention has an improved flexibility and tensile strength and can be decomposed and absorbed in a living body or can be biodegraded and hydrolyzed in the natural environment.

The nonwoven fabric of the invention is prepared by bonding or intertwining a web of the filament.

The degradable composite of the invention is comprised of a cellulose material and a thermoplastic polymer composition having aliphatic polyester as a main component, processed into a sheet or film, and can be used for a moisture-proof packaging material, toiletry box and container for milk and juice.

The resin formed product of the invention including a foam, fabric for an industrial material, filament, degradable nonwoven fabric, composite material and film can be degraded similarly to paper, wood and other natural products into nontoxic water and carbon dioxide within a certain period in the natural environment.

DETAILED DESCRIPTION OF PREFERRED EMBODIMENTS

Aliphatic polyester used in the invention is prepared by esterification of an aliphatic polyhydric alcohol or a mixture thereof with an aliphatic polybasic acid or a mixture thereof. These monomers can also include a hydroxycarboxylic acid or a mixture thereof, or an oligomer or these raw materials. Aliphatic polyester can be obtained by conducting a direct polycondensation reaction in a reaction mixture containing an organic solvent.

The polymerization degree of aliphatic polyester is 100–20,000. A polymerization degree lower than 100 results in a low strength of formed products and is not adapted to practical use. On the other hand, when the polymerization degree is too high, melt viscosity rises up and reduces melt processing ability.

The direct polycondensation reaction is carried out in an organic solvent by heating a mixture of a polyhydric alcohol and a polybasic acid or additionally a hydroxycarboxylic acid, while distilling out generated water and excess monomer together with the organic solvent from the reaction system and charging to the reaction system an additional organic solvent containing an amount of water and monomer not more than that dissolved in the distilled organic solvent.

Polyhydric alcohols of the invention have aliphatic hydroxyl groups and include, for example, ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanedimethanol and 1,4-benzenedimethanol.

Exemplary polybasic acids of the invention have aliphatic carboxyl groups and include succinic acid, oxalic acid, malonic acid, glutaric acid, adipic acid, pimelic acid, subelic acid, azelaic acid, sebacic acid, undecane diacid, dodecane diacid, 1,4-phenylenediacetic acid and phenylsuccinic acid. Anhydrides of these polybasic acids can also be used.

Representative hydroxycarboxylic acids which can be used include lactic acid, glycolic acid, 3-hydroxybutyric acid, 4-hydroxybutyric acid, 3-hydroxyvaleric acid, 5-hydroxyvaleric acid and 6-hydroxycaproic acid. When these raw materials have an asymmetric carbon atoms in the molecule, individual D-, L-, DL-isomer and a mixture thereof can be used.

In order to obtain a nonwoven fabric having a smooth surface, polymer is preferably prepared in view of economy from ethylene glycol as a polyhydric alcohol and succinic acid as a polybasic acid.

When lactic acid or glycolic acid is added as a hydroxycarboxylic acid, the proportion is preferably 50% or less, more preferably 20% or less.

The polycondensation reaction can progress by heating in the absence of a catalyst. The catalyst, however, can accelerate the reaction velocity. The catalysts which can be used in the invention are metals of the group II, III, IV, and V in the periodic table and oxides or salts thereof. Exemplary catalysts include zinc powder, tin powder; aluminum, magnesium, titanium, germanium and other metals; tin oxide, antimony oxide, zinc oxide, aluminum oxide, magnesium oxide, titanium oxide and other metal oxides; stannous chloride, stannic chloride, stannous bromide, stannic bromide, antimony fluoride, zinc chloride, magnesium chloride, aluminum chloride and other metal halogenides; tin sulfate, zinc sulfate, aluminum sulfate and other metal sulfates; magnesium carbonate, zinc carbonate and other metal carbonates; tin acetate, stannous octoate, tin lactate, zinc acetate, aluminum acetate and other metal organic carboxylates; tin trifluoromethanesulfonate, zinc trifluoromethanesulfonate, magnesium trifluoromethanesulfonate, tin methanesulfonate, tin p-toluenesulfonate and other metal organic sulfonates; dibutyltin oxide and other organic metal oxides of the above metals; titanium isopropoxide and other metal alkoxide of the above metals; diethyl zinc and other alkyl metal of the above metal; and DOWEX®, AMBERLITE® and other ion exchange resins.

The amount in use of these catalysts is usually 0.0001–10 wt %, preferably 0.001–2 wt % in view of economy for the total amount of aliphatic polyhydric alcohol and aliphatic polybasic acid or aliphatic polyhydric alcohol, aliphatic polybasic acid and aliphatic hydroxycarboxylic acid to be used, or an oligomer of these raw materials.

Exemplary solvents which can be used for preparing aliphatic polyester of the invention include, for example, toluene, xylene, mesitylene and other hydrocarbon solvents; chlorobenzene, bromobenzene, iodobenzene, dichlorobenzene, 1,1,2,2-tetrachloroethane, chlorotoluene and other halogenated hydrocarbon solvents; 3-hexanone, acetophenone, benzophenone and other ketone solvents; dibutyl ether, anisole, phenetol, o-dimethoxybenzene, p-dimethoxybenzene, 3-methoxytoluene, dibenzyl ether, benzyl phenyl ether, methoxynaphthalene and other ether solvents; diphenyl sulfide, thioanisole and other thioether solvents; methyl benzoate, dimethyl phthalate, diethyl phthalate and other ester solvents; diphenyl ether, 4-methyldiphenyl ether, bis(3-methylphenyl)ether, 3-phenoxy toluene and other alkyl substituted diphenyl ether solvents; 4-bromodiphenyl ether, 4-chlorodiphenyl ether, 4-methyl-4'-bromodiphenyl ether and other halogen substituted diphenyl ether solvents; 4-methoxydiphenyl ether, 4-ethoxydiphenyl ether, 3-methoxydiphenyl ether, 4-methyl-4'-methoxydiphenyl ether and other alkoxy substituted diphenyl ether solvents; and dibenzofuran, xanthene and other cyclic diphenyl ether solvents. These solvents can be used singly or as a mixture. Solvents which can be separated from water with ease is preferable. In order to obtain polyester having a high average molecular weight in particular, ether solvents, alkyl aryl ether solvents and diphenyl ether solvents are more preferably used, and alkyl aryl ether solvents and diphenyl ether solvents are most preferably used.

These solvents are preferably used in an amount so as to obtain a polymer concentration of 10–80%.

In the preparation of aliphatic polyester, generated water and excess monomer are preferably distilled out of the reaction system by azeotropic distillation of the organic solvent and water or the monomer.

When an azeotropically distilled solvent contains water or the monomer in an amount higher than the solubility of water or the monomer in said organic solvent, water or the monomer is removed by separation and a residual organic solvent can be successively returned to the reaction system. In order to further remove water and a monomer which are still dissolved in the organic solvent after separation, the organic solvent can be dehydrated, treated with a monomer removing agent or redistilled, and a solvent containing a reduced amount of water and monomer can be returned to the reaction system.

Alternatively, a new organic solvent having a low content of water and monomer can be charged in place of the azeotropically distilled organic solvent.

Further, water and excess monomer can be removed under reduced pressure in the first stage of the reaction, an organic solvent is successively added and a portion of the organic solvent can be removed from the reaction mixture to adjust content of water and monomer to a prescribed value in the reaction mixture. That is, the polycondensation reaction proceeds while removing water and the excess monomer with the aid of a solvent at least at a certain stage of the reaction. In an embodiment of the reaction, solvent can or cannot be azeotropically distilled with or separated from water and monomer.

Other embodiments which can be included are a process for previously charging a solvent in excess and carrying out dehydration and monomer removal merely by removing the solvent, a process for carrying out dehydration and monomer removal of the solvent by using a different kind of solvent, and a modified process for removing water and monomer in the liquid state of reaction solvent itself. As to reaction temperature, the reaction can be carried out at the azeotropic temperature of the solvent with water and monomer. In the case the dehydration reaction comes nearly to the end, the boiling point of the solvent system Ray increase. However, there is no problem in the case if the reaction is conducted in a given temperature range.

The average molecular weight (a weight average molecular weight unless otherwise specified) of the aliphatic polyester depends also upon the content of water and monomer in the organic solvent charged to the reaction system, although it depends on the kind of solvent. When the solvent has a high water and monomer content of 400–500 ppm, aliphatic polyester obtained has a weight average molecular weight of 15,000–50,000. It is surprising that, even under the high water and monomer content as above, aliphatic polyester having a weight average molecular weight of 40,000–50,000 can be obtained by using a diphenyl ether based solvent. In order to further increase the average molecular weight of aliphatic polyester, it is desired to reduce the water and monomer content of the organic solvent charged to the reaction system. Accordingly, azeotropically distilled organic solvent is dehydrated or treated with a dehydrating agent to reduce or remove water and monomer and thereafter returned to the reaction system. Alternatively, a new organic solvent having a low content of water and monomer is charged to the reactor. These procedures can reduce the amount of water and monomer to 50 ppm or less, and provide an aliphatic polyester having a weight average molecular weight of 50,000–300,000.

Exemplary dehydrating and monomer-removing agents which can be used for preparing the high molecular weight polyester for use in the nonwoven fabric of the invention include molecular sieve 3A, molecular sieve 4A, molecular sieve 5A, molecular sieve 13X and other molecular sieves; alumina, silica gel, calcium chloride, calcium sulphate, diphosphorus pentoxide, concentrated sulphuric acid, magnesium perchlorate, barium oxide, calcium oxide, potassium hydroxide, sodium hydroxide; calcium hydride, sodium hydride, lithium aluminum hydride and other metal hydrides; and sodium and other alkali metals. Molecular sieves are preferred in these agents in view of ease for handing and recovery.

An exemplary preparation process of polyester in the invention will be illustrated below.

That is, a solvent, a prescribed amount of ethylene glycol, succinic acid and lactic acid, and a prescribed amount of a catalyst are charged to a reaction vessel equipped with a separator, for example, a Dean Stark Trap. The reaction vessel is heated and azeotropically distilled solvent, water and excess monomer are introduced into the separator. Water and monomer which exceed solubility in the solvent are separated in the separator and removed from the reaction system. The residual solvent saturated with water and monomer is returned to the reaction system. The weight average molecular weight of the polymer is 500–1,000 in this stage and can be increased to 5,000. The reaction time is from 0.5 to several hours. The oligomerization reaction can be previously carried out in a separate reaction vessel under a reduced pressure in the absence of a solvent and catalyst, or in a solvent in the absence of a catalyst.

The reaction can be continued at the azeotropic distillation temperature of the solvent while removing generated water and excess monomer with the progress of the reaction and returning the solvent saturated with water and monomer to the reaction system. Such a process, however, merely provides a polymer having an average molecular weight of 15,000–50,000 depending upon the solvent even after reacting for dozens of hours.

In order to obtain a polymer having a higher molecular weight, the separator is dismantled after distilling most of the excess monomer and water contained in the raw materials and a tube packed with a drying agent such as molecular sieves is mounted on the reaction vessel so as to return the distilled solvent to the reaction vessel by way of the tube. Alternatively, the distilled solvent may come into contact with a drying agent in another reaction vessel and successively returned to the reaction system, or a new solvent having a low content of water and monomer may be fed to the reaction vessel. The amount of water and monomer dissolved in the solvent is reduced to 50 ppm or less by such configuration of equipment. When the reaction is continued for dozens of hours under these conditions, a polymer having a weight average molecular weight of 50,000–300,000 can be obtained depending upon the solvent. After finishing the reaction, the polymer can be isolated by any method. For example, the reaction mixture is dissolved in chloroform by heating, cooled and poured into acetone. The precipitated crystals are filtered and dried to obtain the desired polymer.

The weight average molecular weight of aliphatic polyester obtained by the process varies depending upon kind of the solvent, kind and amount of the catalyst, reaction rate, reaction time and treating method of the azeotropically distilled solvent and is usually in the range of 15,000–300,000. In the case of carrying out the polycondensation reaction of the invention in the presence of a catalyst, residual catalyst in the polymer obtained gives adverse effects on the thermal stability and weatherability. Accordingly, it is preferred to remove the residual catalyst in the polymer. A preferred removing method is to cool the reaction mixture with stirring or as intact and to bring the resulting powdery or solid polymer into contact with an acidic substance in the presence of a hydrophilic organic solvent.

Hydrophilic organic solvents which can be used for the method include, for example, methanol, ethanol, isopropanol, butanol and other alcohols; acetone, methyl ethyl ketone and other ketones; tetrahydrofuran, dioxane and other ethers; acetic acid, butyric acid and other carboxylic acids; acetonitrile and other nitriles; and N,N-dimethylformamide, N,N-dimethylacetamide, 1,3-dimethylimidazolidinone, hexamethylphosphoramide and other amides. Preferred organic solvents are alcohols which are cheap and do not dissolve the polymer.

Exemplary acidic substances include hydrochloric acid, sulfuric acid, nitric acid, phosphoric acid and other inorganic acids; and acetic acid, p-toluenesulfonic acid and other organic acids. Hydrochloric acid, sulfuric acid and nitric acid are particularly preferred because of low cost.

The amount of the acidic substance is usually 0.0001–5.0 mols, preferably 0.001–1 mol for 100 parts by weight of the polymer. When the amount is less than 0.0001 mol, the removing effect on the catalyst is reduced. On the other hand, an amount larger than 5.0 mols is liable to cause problems on deterioration.

Morphology of the solid polymer used in the method is powder, granule, particle, flake and block. The polymer is generally obtained by dissolving the polymer in a good solvent and dropwise adding the solution to a lean solvent or vice versa, or by thermally dissolving the polymer in a specific solvent and successively cooling the solution to cause crystallization of the polymer.

Bulk density of the polymer is preferably 0.60 g/ml or less, more preferably 0.05–0.5 g/ml. Bulk density higher than 0.60 g/ml leads to insufficient contact with the acidic substance and the catalyst in the polymer cannot be completely removed in some cases. On the other hand, bulk density lower than 0.05 g/ml causes no problem on the catalyst removal, but impairs filterability after treatment and sometimes results in problems on operation.

Polymer is brought into contact with an acidic substance under conditions such as a solid concentration of preferably 3–40% by weight in a hydrophilic organic solvent, a contact temperature of preferably 0°–100° C., more preferably 0°–60° C., and a contact time of preferably 0.1–24 hours, more preferably 0.5–8 hours.

Aliphatic polyester of the invention is converted to a thermoplastic polymer composition by formulating with a known thermoplastic polymer, plasticizer and various kind of additives and modifiers. The additives and modifiers which can be used, when necessary, are a plasticizer, ultraviolet absorber, light stabilizer, heat stabilizer, lubricant, antioxidant, colorant, flame retardant, filler and so on.

The proportion of aliphatic polyester in the thermoplastic polymer composition varies depending upon desired degradability and a proportion of 50% or more is generally preferred. Any known kneading technique is applicable to the preparation of thermoplastic polymer composition.

The thermoplastic polymer composition thus obtained can be used in the form of pellet, rod or powder.

The present inventors have found that the above aliphatic polyester can provide a foam having excellent properties such as thermal insulation, strength and elongation, and that the above polyester can be foamed without impairing degradability of the polymer.

Foam of the present invention can be prepared by an arbitrary foaming process from the thermoplastic polymer composition comprising an aliphatic polyester. Preparation of foam is preferably carried out by using a blowing agent in view of ease and cheapness. Foaming is preferably carried out in the step of forming. Preferably used process is so called extrusion foaming process where foaming is carried out simultaneously with delivery from an extruder.

Blowing agents which can be used for foaming in the invention are classified into the following two groups. One is decomposition type blowing agents which generate gas by heat decomposition and includes, for example, sodium hydrogen carbonate and other inorganic blowing agents; and azodicarbonamide, N,N'-dinitrosopentamethylenetetramine, p,p'-oxybis(benzenesulfonylcarbazide), azobisisobutyronitrile, benzenesulfonylhydrazide and other organic blowing agents. The other is a evaporation type and compressed gas type blowing agents and includes, for example, ethane, propane, butane, pentane, hexane, heptane, ethylene, propylene, petroleum ether and other hydrocarbons; methyl chloride, monochlorotrifluoromethane, dichlorodifluoromethane, dichlorotetrafluoroethane and other halogenated hydrocarbons; and carbon dioxide gas and nitrogen gas.

The amount of these blowing agents is preferably 0.1–30% by weight, more preferably 0.5–10% by weight for the polymer composition.

A suitable amount of an auxiliary blowing agent, foam stabilizer or nucleating agent can be added when necessary. Exemplary agents include stearic acid, oxalic acid, salicylic acid, phthalic acid benzoic acid citric acid, tartaric acid and other organic acids; boric acid and other inorganic acids; salts of the above organic and inorganic acids; sodium carbonate and other carbonates; zinc oxide, calcium oxide, titanium oxide, silica, alumina and other metal oxides; and clay, kaolin, diatomaceous earth and other silicates.

In order to color or modify foamed products, a suitable amount of colorant, flame retardant or filler can be added.

Foaming conditions differ depending upon polymer composition. Foaming is usually carried out in a temperature range capable of maintaining melt viscosity of 10,000–80,000 poise. When the temperature is lower than the range, polymer viscosity increases, bubble generation is slow and thus a low expansion ratio is obtained. On the other hand, when the temperature is higher than the range, melt viscosity of the polymer becomes too low to maintain bubbles and thus the foam is collapsed.

The expansion ratio differs depending upon the object. An expansion ratio of 1.5–6 is preferred for food packaging trays which require high strength. In the case of thermal insulation materials and shock absorbers which do not require high strength, the expansion ratio is 3–25.

Cell size of the foam is preferably 0.1–5 mm Φ. When the cell size is less than 0.1 mm, production loss increases in the foaming step. On the other hand, a size exceeding 5 mm leads to brittle surface of the foam.

The ratio of closed cell content is preferably 90% or more. When the ratio is lower, the thermal insulation is inferior.

The thus-obtained thermoplastic polymer foam comprising an aliphatic polyester has a high flexibility as compared with conventional biodegradable foam of polyhydroxycarboxylic acid. For example, as clearly seen in the below described examples, the foam of the invention has tensile elastic modulus which is less than a fraction of tensile elastic modulus of a polylactic acid foam having an equivalent expansion ratio, has satisfactory softness, exhibits characteristics similar to polyethylene foam, and thus can be preferably used in the field of soft shock absorbers, packaging materials and food containers.

The present inventors have further found that the above aliphatic polyester can provide a fabric having excellent properties such as thermal insulation, strength and elongation, and that the fabric can be used for an industrial material without impairing degradability of the polymer. In order to obtain a fabric from the thermoplastic polymer composition of the invention, the composition is generally processed into a filament by melt-spinning process and successively processed into a fabric with weaving machine.

No particular restriction is imposed upon the melt-spinning equipment for use in filament preparation so long as the equipment is fitted with a melting zone comprised of a cylinder and screw which have a temperature control unit, and a spinning head part fitted with a spinning nozzle. Spinning temperature depends upon kind and molecular weight of the polymer and is generally in the range of 80°–300° C. preferably 100–250° C. A temperature lower than 80° C. leads to high melt viscosity and a filament having good properties cannot be obtained. A temperature higher than 300° C. unfavorably causes decomposition.

Commonly used spinning nozzles can be used for preparing the monofilament in the invention. For example, a preferred nozzle has a bore diameter of 0.3 mm or less. A molten monofilament delivered is cooled, stretched in a hot heat-medium and successively heat-set to obtain a filament. Stretching conditions such as a stretching temperature and a stretch ratio are suitably selected depending upon the properties required for the filament and the stretching temperature usually above the glass transition temperature and below the melting point. For example, the filament is preferably stretched in a temperature range of 0–100° C. at a stretch ratio of 4–15. It is also desired to perform stretching in a multi stage operation of two step or more.

Size of the filament is preferably 100–1300 deniers in order to obtain a fabric useful for industrial materials. The filament obtained is generally woven into a fabric with a common weaving for use in synthetic fiber, for example, a heavy cloth weaving machine for preparing canvas and concrete-curing sheet.

The fabric thus obtained is applied to industrial materials corresponding to desired uses. A preferred fabric of the invention which is useful for industrial materials has a plain-weaved structure wherein the filaments in the longitudinal and transverse directions are alternately woven, and also has a filament size of 100–1300 deniers and a void volume in the fabric of 50–74%. When the void volume is less than 50%, the amount of resin penetration into the void of the fabric is too small in the case of laminating the fabric with resin and adhesion strength becomes insufficient. On the other hand, a void volume of greater than 74% leads to low fabric strength and is unsuitable for industrial materials.

The thus obtained fabric of the thermoplastic polymer composition comprising an aliphatic polyester has high flexibility as compared to a fabric of conventionally known biodegradable polyhydroxycarboxylic acid.

For example, as clearly seen in the examples below, the fabric of the invention has a tensile elastic modulus which is a fraction or less as compared with a polylactic acid fabric, exhibits satisfactory softness, has similar properties to polyethylene fabric and can be suitably used for flexible industrial materials.

The present inventors have still also found that a filament comprised of the above polyester has sufficient strength and flexibility and is degradable in a living body or under natural environment, and that the filament can be used for a suture and ligature as a bioabsorbable surgical filament. Particularly, the highly flexible monofilament of the above polyester has a good surface-slip characteristic which cannot be obtained from a multifilament and is very valuable as a surgical filament. Additionally, the monofilament can also be used as an excellent fishing line without damaging natural environment due to the biodegradability, hydrolyzability and high tensile strength of the monofilament.

The filament obtained by spinning the thermoplastic polymer composition of the invention or by further stretching the spun filament can be used as a surgical filament which is degradable and absorbable in a living body, and also can be applied to both multifilament and monofilament uses.

Multifilament, however, is prepared by collecting and knitting many monofilaments. Thus, the surface of a suture is not smooth and develops considerable friction in the case of making a knot or passing through a tissue in a surgery. Consequently, a lubricant is inevitably coated on the surface of a multifilament suture in order to improve surface smoothness. The requirement renders production process complex and also causes a problem on safety of the coated agent. Monofilaments are more preferred for the suture in view of the above problems and the filament of the invention is preferably used due to satisfactory flexibility.

Commonly known extruders can be used for spinning. A bore diameter of the extruder nozzle is suitably determined in relation to a required filament diameter, delivery rate of the extruder, take-up speed and stretch ratio. A preferred bore diameter is 0.5–3.0 mm. Spinning is carried out by known methods including melt spinning and solution spinning such as wet spinning and dry spinning.

In the case of melt spinning, the spinning temperature is generally in the range of 80°–300° C., preferably 100°–250° C. When the temperature is lower than 80° C., melt viscosity of the polymer composition is too high and spinning becomes difficult. On the other hand, a spinning temperature exceeding 300° C. unfavorably decreases strength of the resulting filament due to thermal decomposition.

In the case of solution spinning, chloroform, hexafluoroisopropanol, o-chlorophenol and other solvents can be used. Spinning is carried out at a temperature lower than the boiling point of the solvent. Preferred concentration of the solution is usually 10–30%.

The unstretched filament obtained by spinning can be converted into a filament having a tensile strength of 20 kg/mm$^2$ or more. Preferred stretching conditions are a stretching temperature of 40°–110° C. and a stretch ratio of 5–25. A stretch ratio less than 5 cannot provide sufficient tensile strength of the stretched filament. On the other hand, a stretch ratio exceeding 25 unfavorably leads to filament breakage in the course of stretching.

The filament of the invention can also be used for a biodegradable fishing line. The fishing line can be prepared by spinning or further stretching the above polymer composition. The fishing line thus obtained can maintain sufficient tensile and flexural strengths which are capable of enduring use over a prescribed period, while providing gradually decreasing strengths after being abandoned or left in water, so as to scatter into pieces, and finally disappearing by degradation.

The biodegradable and hydrolyzable polyester which is a raw material capable of being applied to the fishing line of the invention must have strength sufficient to comply with uses in the form of filament.

In the case of a fishing line, tensile strength is preferably 40 kg/mm$^2$ or more and elongation at break is preferably 20% or less. The above polymer can provide such strength and elongation by increasing the molecular weight. Elongation less than 20% is preferred because a signal for catching a fish can be sharply transmitted and an operation for landing the fish can be performed with ease.

In preparing the fishing line of the invention, the polymer composition in the form of powder can be used as intact for a spinning material or can also be used after once pelletized with an extruder. No particular restriction is imposed on the melt-spinning equipment so long as the equipment is fitted with a melting zone comprised of a cylinder and screw which have a temperature control unit and a spinning head part fitted with a spinning nozzle. A commonly available nozzle can be used for spinning the fishing line. For example, a preferred nozzle has a bore diameter of about 1 mm.

Spinning temperature of the fishing line depends upon kind and molecular weight of the polymer and is in the range of 80°–300° C., preferably 100°–250° C. A temperature lower than 80° C. leads to too high melt viscosity of the polymer composition and makes spinning difficult. On the other hand, a temperature exceeding 300° C. unfavorably lowers the strength of the resulting filament because of heat decomposition.

The fishing line of the invention can be prepared by using the unstretched filament as such or by using the filament after stretching, heat treating or subjecting to a combined treatment thereof. The filament thus obtained has a high strength, high elastic modulus, low elongation and low absorbability.

The present inventors have still further found that a nonwoven fabric having excellent properties such as strength and feeling can be obtained by bonding a web comprised of a filament having the above aliphatic polyester, and that the nonwoven fabric can be prepared without impairing the degradability of the polymer. That is, a degradable nonwoven fabric can be obtained by bonding a web comprised of a filament having aliphatic polyester.

The nonwoven fabric of the invention can be prepared by spinning aliphatic polyester, successively forming a web, and bonding the web by conventionally known methods, for example, a needle-punching method, stitch bonding method, jet bonding method, thermal bonding method and resin bonding method.

Known spinning processes can be applied to spin the raw material filament. Applied processes are, for example, a melt spinning process for carrying out melt spinning with an extruder, a wet spinning process for dissolving the resin comprising the above aliphatic polyester and delivering the resin solution from a nozzle to a lean solvent and a dry spinning process for delivering the resin solution from the nozzle to dry gas. Melt spinning process can be carried out with a conventional extruder such as a singly screw extruder and twin screw extruder. Low extrusion temperature is difficult to provide extrusion stability and is liable to cause overload. On the other hand, when the extrusion temperature is too high, heat decomposition of the polymer is accelerated and leads to lowering of molecular weight, decrease in strength and color development. In view of these problems, extrusion temperature is in the range of preferably 80°–300° C., more preferably 100°–250° C.

The bore diameter of the extrusion nozzle is suitable determined in relation to the required diameter (size) of the filament, delivery rate of the extruder and take-up speed. Preferred diameter is 0.1–3.0 mm.

Stretching of a spun filament is not always required in any spinning method. In the case of stretching the filament, the stretch ratio is usually 1.1–10, preferably 2–8. Stretching temperature is in the range of 0°–100° C.

Preferred size of the filament is 0.5–40 deniers. Preferred length of the filament is 0.5–30 cm.

A massed state of filaments called a web is formed from the filament obtained. The filament is not bonded each other in the state of the web. Consequently, the web cannot as intact be called as a nonwoven fabric.

Known processes are used for preparation of the web and not restricted in particular. Exemplary processes include, for example, a card process using a flat card machine, roller card machine and garnet, and a melt-blown process. Another process which can also be used is a spun bonding process for blowing high speed air to the outlet of a spinning nozzle in the spinning of the resin and forming a web by collecting delivered filaments on a perforated conveyor situated perpendicularly to the direction of air flow.

The degradable nonwoven fabric of the invention can be prepared by using known processes from a web comprised of filaments of resin consisting essentially of the above aliphatic polyester. Known processes include for example, a needle punching process using a needle, stitch bonding process using a thread, jet bonding process using water jet, thermal bonding process using heat adhesion and resin bonding process using resin adhesion.

The filament consisting essentially of aliphatic polyester of the invention can comprise, when necessary, a plasticizer, ultraviolet absorber, light stabilizer, heat stabilizer, lubricant, antioxidant and other additives.

The thus obtained nonwoven fabric of the thermoplastic polymer composition comprising an aliphatic polyester provides an excellent nonwoven fabric of biodegradable polyhydroxycarboxylic acid. For example, as clearly seen in the examples below, the nonwoven fabric of the invention has a higher impact resilience than conventional nonwoven fabric of polylactic acid, also has a good feeling, and exhibits similar properties to nonwoven fabric of polyethylene. Consequently, nonwoven fabric of the invention can be suitably applied to uses which require elasticity and smoothness, for example, diapers, sanitary goods and other industrial materials.

The present inventors have further found that a film having excellent properties such as thermal resistance and strength can be obtained from the resin having the above aliphatic polyester as a main component and that the film can be used as a packaging material without impairing the degradability of the polymer.

Cellulosics which are used for a composite material of the invention include wood pulp, cotton linter and other natural products; filament, paper, nonwoven fabric and other processed articles thereof; cellophane, viscose rayon and other regenerated cellulosics; nitrocellulose, cellulose acetate and other cellulose esters which are esterified by nitric acid, sulfuric acid, acetic acid, propionic acid, butyric acid and other higher aliphatic carboxylic acids; and methyl cellulose, ethyl cellulose, benzyl cellulose, carboxymethyl cellulose, hydroxyethyl cellulose, hydroxypropyl cellulose, ethylhydroxyethyl cellulose, carboxymethylethyl cellulose and other cellulose ethers. Cellulose derivatives have higher resistance to heat and water as compared to usual cellulose. These materials can preferably improve their properties by making a composite with aliphatic polyester of the invention.

Paper in the above cellulosics includes coated paper, kraft paper, rolled paper, rice paper, cross paper and corrugated paper. The paper can comprise regenerated pulp.

The composite is prepared by a process for coating or impregnating cellulosics such as fiber and paper with a polymer or solution thereof, a process for mixing polymer filament or polymer pulp with cellulosics such as fiber or pulp and adhering the resulting mixture by heating under pressure, and a process for adhering cellulosics such as film or paper with a polymer film by heat or adhesive. Particularly preferred process is extrusion coating wherein a molten polymer is extruded and continuously coated on rolled paper or other sheets. In the case of using an adhesive, glue, gelatin, casein, starch and other degradable adhesives are preferably used.

The thus obtained composite of material of cellulosics and a thermoplastic polymer composition comprising an aliphatic polyester has high flexibility as compared with a conventionally known composite material prepared by using biodegradable polyhydroxycarboxylic acid. For example, as clearly seen in the examples below, the composite material of the invention has higher folding resistance as compared with a composite material obtained by using polylactic acid, maintains satisfactory softness, exhibits properties similar to a polyethylene composite, and thus can be suitably used in the field of packaging materials and food containers.

Next, the film of the thermoplastic polymer composition of the invention can be prepared by any process which includes, for example, press, casting inflation, T-die extrusion and blow forming.

The thus obtained film comprising an aliphatic polyester has higher flexibility as compared with conventionally known film prepared by using biodegradable polyhydroxycarboxylic acid. For example, as clearly seen in the examples below, the film of the invention has higher elongation as compared with the film of polylactic acid, maintains satisfactory softness, exhibits properties similar to a polyethylene film and thus can be suitably used in the field of packaging materials.

EXAMPLE

The present invention will now be illustrated in detail by way of examples and comparative examples.

The weight average molecular weight in the examples was measured by gel permeation chromatography at a column temperature of 40° C. in a chloroform solvent using polystyrene as a reference sample.

Preparation Example 1

To 20.0 g of ethylene glycol and 38.1 g of succinic acid, 207.0 g of diphenyl ether and 0.931 g of metallic tin were added and the mixture was oligomerized by heating at 130° C. for 7 hours with stirring under reduced pressure of 140 mm Hg while distilling water out of the reaction system. Successively, a Dean Stark Trap was mounted on the reaction vessel and azeotropic dehydration was carried out at 140° C. for 8 hours under reduced pressure of 30 mm Hg. Thereafter a tube packed with 20 g of molecular sieve 3A was fitted on the reaction vessel so as to return the distilled solvent to the reaction vessel after passing through the molecular sieve layer and the reaction mixture was stirred at 130° C. for 49 hours under reduced pressure of 17 mm Hg.

The reaction mass obtained was dissolved in 400 ml of chloroform, reprecipitated by pouring the resulting solution into 3 l of acetone, sludged 3 times for each 0.5 hour with an isopropyl alcohol (hereinafter referred to as IPA) solution containing 0.7 wt % of HCl, washed with IPA and dried at 60° C. for 6 hours under reduced pressure.

Polymer thus prepared had a weight average molecular weight of 124,000 and a residual tin catalyst content of 10 ppm or less.

Preparation Example 2

To 50.5 g of 1,4-butanediol and 66.5 g of succinic acid, 293.0 g of diphenyl ether and 2.02 g of metallic tin were added and an oligomer was prepared by heating the mixture at 130° C. for 7 hours with stirring under reduced pressure of 140 mm Hg while distilling water out of the reaction system. Successively, a Dean Stark Trap was mounted on the reaction vessel and azeotropic dehydration was carried out at 140° C. for 8 hours under reduced pressure of 30 mm Hg. Thereafter a tube packed with 40 g of molecular sieve 3A was fitted on the reaction vessel so as to return the distilled solvent to the reaction vessel after passing through the molecular sieve layer and the reaction mixture was stirred at 130° C. for 49 hours under reduced pressure of 17 mm Hg.

The reaction mass obtained was dissolved in 600 ml of chloroform, reprecipitated by pouring the resulting solution into 4 l of acetone, sludged 3 times for each 0.5 hour with an IPA solution containing 0.7 wt % of HCl, washed with IPA and dried at 60° C. for 6 hours under reduced pressure. Polymer thus prepared had a weight average molecular weight of 118,000 and a residual tin catalyst content of 10 ppm or less.

Preparation Example 3

To 80.8 g trans-1,4-cyclohexanedimethanol and 66.5 g of succinic acid, 293.0 g of diphenyl ether and 2.02 g of metallic tin were added and the mixture was oligomerized by heating at 130° C. for 7 hours with stirring under reduced pressure of 140 mm Hg while distilling water out of the reaction system. Successively, a Dean Stark Trap was mounted on the reaction vessel and azeotropic dehydration was carried out at 140° C. for 8 hours under reduced pressure of 30 mm Hg. Thereafter a tube packed with 40 g of molecular sieve 3A was fitted on the reaction vessel so as to return the distilled solvent to the reaction vessel after passing through the molecular sieve layer and the reaction mixture was stirred at 130° C. for 40 hours under reduced pressure of 17 mm Hg.

The reaction mass obtained was dissolved in 600 ml of chloroform, reprecipitated by pouring the resulting solution into 4 l of acetone, sludged 3 times for each 0.5 hour with an IPA solution containing 0.7 wt % of HCl, washed with IPA and dried at 60° C. for 6 hours under reduced pressure. Polymer thus prepared had a weight average molecular weight of 122,000 and a residual tin catalyst content of 10 ppm or less.

Preparation Example 4

To 20.2 g of ethylene glycol, 38.5 g succinic acid and 7.3 g of lactic acid, 123.0 g of diphenyl ether and 0.66 g of metallic tin were added, and the mixture was oligomerized by heating at 125° C. for 9 hours with stirring under reduced pressure of 140 mmHg while distilling water out of the reaction system. Successively, a Dean Stark Trap was mounted on the reaction vessel and azeotropic dehydration was carried out at 140° C. for 3 hours under reduced pressure of 15 mmHg. Thereafter a tube packed with 30 g of molecular sieve 3A was fitted on the reaction vessel so as to return the distilled solvent to the reaction vessel after passing through the molecular sieve layer and the reaction mixture was stirred at 130° C. for 33 hours under reduced pressure of 13 mm Hg.

The reaction mass obtained was dissolved in 720 ml of acetonitrile. The resulting solution was mixed with 300 ml of a 1N aqueous HCl solution, stirred for 0.5 hour, mixed with 320 ml of IPA and successively reprecipitated by pouring the mixture into 4.5 l of methanol. The precipitate was washed with 3 l of n-hexane and dried under reduced pressure. Polymer thus obtained had a weight average molecular weight of 147,000 and a residual tin catalyst content of 10 ppm or less.

Preparation Example 5

To 35.0 g of 1,4-butanediol, 30.4 g of succinic acid and 9.4 g of adipic acid, 176 g of diphenyl ether and 0.66 g of metallic tin were added and the mixture was oligomerized by heating the mixture at 130° C. for 10 hours with stirring under reduced pressure of 140 mm Hg while distilling water out of the reaction system. Successively, a Dean Stark Trap was mounted on the reaction vessel and azeotropic dehydration was carried out at 140° C. for 5 hours under reduced pressure of 15 mm Hg. Thereafter a tube packed with 30 g of molecular sieve 3A was fitted on the reaction vessel so as to return the distilled solvent to the reaction vessel after passing through the molecular sieve layer and the reaction mixture was stirred at 130° C. for 30 hours under reduced pressure of 13 mm Hg.

The reaction mass obtained was dissolved in 720 ml of acetonitrile. The resulting solution was mixed with 300 ml of a 1N aqueous HCl solution, stirred for 0.5 hour, mixed with 320 ml of IPA and successively reprecipitated by pouring the mixture into 4.5 l of methanol. The precipitate was washed with 3 l of n-hexane and dried under reduced pressure. Polymer thus prepared had a weight average molecular weight of 137,000 and a residual tin catalyst content of 10 ppm or less.

Examples 1-1–1-5

The aliphatic polyester obtained in Preparation Examples 1–5 were individually incorporated with 0.5 parts by weight of talc as a cell regulator, melt-kneaded with an extruder having a bore diameter of 50–65 mm, and successively Freon-22® (E.I. Dupont product) was charged with pressure at a rate of 0.065 mol for 100 g of the resin and the mixture was delivered from a slit at 140° C. into the air to obtain foamed sheets. Thickness, apparent density, and tensile modulus of these foamed sheets were measured. Specimens having dimensions of 10×50 mm were respectively cut out of these foamed sheets and degradation tests were carried out at 40° C. in a compost. Results are summarized in Table 1.

Comparative Example 1-1

Foamed sheets were prepared by carrying out the same procedures as described in Example 1-1 except that polyethylene (Mirason-11 ®, Mitsui Petrochemicals product) was used in place of the aliphatic polyesters.

Thickness, apparent density and tensile modulus were measured on these foamed sheets. Specimen having dimensions of 10×50 mm were individually cut out of these foamed sheets and degradation tests were carried out on these specimens at 40° C. in a compost. Results are summarized in Table 1.

Comparative Example 1-2

Foamed sheets were prepared by carrying out the same procedures as described in Example 1-1 except that polylactic acid having a weight average molecular weight of 100,000 was used in place of the aliphatic polyesters.

Thickness, apparent density and tensile modulus of foamed sheets were measured. Specimens having dimensions of 10×50 mm were individually cut out of these foamed sheets and degradation tests were carried out at 40° C. in a compost. Results are summarized in Table 1.

Example 1-6

Aliphatic polyester obtained in Preparation Example 1 was dry blended with 1.5 wt % of azodicarbonamide as a foaming agent, melt-kneaded in an extruder having a bore diameter of 50 mm, and delivered at 140° C. from a slit into the air to obtain a foamed sheet. Thickness, apparent density and tensile modulus of the foamed sheet were measured. Specimens having dimensions of 10×50 mm were cut out of the foamed sheet end a degradation test was conducted at 40° C. in a compost. Results are illustrated in Table 2.

Example 1-7

Aliphatic polyester obtained in Preparation Example 1 was dry blended with 1.5 wt % of sodium hydrogen carbonate and 1.2 wt % of citric acid as foaming agents, melt-kneaded in an extruder having a bore diameter of 50 mm and delivered from a slit at 140° C. into the air to obtain a foamed sheet. Thickness, apparent density and tensile modulus of the foamed sheet were measured. Specimens having dimensions of 10×50 mm were cut out of the foamed sheet and a degradation test was carried out in a compost. Results are illustrated in Table 2.

Comparative Example 1-3

A foamed sheet prepared by carrying out the same procedures as described in Example 1-5 except that the aliphatic polyester was replaced by polylactic acid having a weight average molecular weight of 100,000. Thickness, apparent density and tensile modulus of the foamed sheet were measured. Specimens having dimensions of 10×50 mm were cut out of the foamed sheet and a degradation test was carried out in a compost at 40° C. Results are illustrated in Table 2.

Examples 2-1–2-5

Aliphatic polyesters obtained in Preparation Examples 1–5 were dried in a vacuum desiccator and melt-spun with a common extruder at 200° C. under extrusion pressure of 130 kg/cm$^2$ while ventilating nitrogen gas from a hopper. The extrudate was successively stretched 5 times at 80° C. and heat-set at 90° C. to obtain filaments of 500 deniers.

These filaments were plain-woven with a Rapier weaving machine so as to obtain a filament density of 24 filaments per inch in the longitudinal direction and 23 filaments per inch in a transverse direction. The fabrics obtained had a void volume of 60%.

Following properties were measured on each fabric.
(1) Tensile modulus and elongation at break:

The test was carried out in accordance with JIS L-1096. The fabrics were cut into rectangular forms and strengths in longitudinal and transverse directions were individually measured at a pulling rate of 200 mm/min.
(2) Degradation in soil:

Fabrics having dimensions of 5×5 cm were buried at 35° C. in soil having a moisture content of 30%. Change in appearance was observed and loss in weight was measured. Results are illustrated in Table 3.

Comparative Example 2-1

A fabric was prepared by carrying out the same procedures as described in Example 2-1 except that aliphatic polyester was replaced by high density polyethylene. Properties of the fabric were measured by the same methods as above and results are illustrated in Table 3.

Comparative Example 2-2

A fabric was prepared by carrying out the same procedures as described in Example 2-1 except that aliphatic polyester was replaced by polylactic acid (L/DL=50/50 wt %) having a weight average molecular weight of about 100,000. Properties of the fabric were measured by the same methods as above and results are illustrated in Table 3.

Examples 2-6–2-7

Polyester obtained in Preparation Example 1 was used. Fabrics were prepared by carrying out the same procedures as described in Example 2-1 except that size and density of the filament were changed. Properties of fabrics were measured by the same methods as above. Results are illustrated in Table 4.

Comparative Example 2-3

A fabric was prepared by carrying out the same procedures as described in Example 2-5 except that aliphatic polyester was replaced by polylactic acid (L/DL=50/50 wt %) having a weight average molecular weight of about 100,000. Properties of the fabric were measured by the same methods as above and results are illustrated in Table 4.

Examples 3-1–3-5

Polymers obtained in Preparation Examples 1–5 were individually spun with an extruder at temperatures illustrated in Table 5 to obtain monofilaments. The extruder nozzle had a bore diameter of 2.0 mm. Monofilaments thus obtained were respectively stretched. The temperature and ratio of stretching are illustrated ion Table 5. Tensile strength of stretched filaments are illustrated in Table 5. Any filaments obtained in these Examples had high flexibility.

Several monofilaments obtained in Example 3-1-3-5 were buried in compost in order to carry out a degradation test. All monofilaments were deteriorated after a month and measurement of strength was almost impossible. When these mono filaments were immersed in sea water or fresh water at 20° C. Any monofilaments were deteriorated after 6 months in sea water or after 11 months in fresh water to such extent that measurement of monofilament strength became almost impossible.

The same monofilaments were transplanted in the skin of rats. Any filaments were deteriorated after a month to such extent that measurement of tensile strength of these monofilaments became almost impossible.

Examples 4-1–4-5

Aliphatic polyesters obtained in preparation Examples 1–5 were dried in a vacuum desiccator and incorporated with 0.1 wt % of 2-(2'-hydroxy-5'-methylphenyl) benzotriazole as an ultraviolet absorber and melt spun at 160° C. with a screw type small extruder. The filament thus obtained was cut into monofilaments of about 4 cm in length, stirred to form a random web and hot-pressed at 60° C. under pressure of 10 kg/cm² to obtain a degradable nonwoven fabric. The nonwoven fabric had a weight of 160 g/cm² and thickness of 2 mm.

The degradable nonwoven fabrics thus obtained had residual fibrous shape, hold cloth construction which clearly differs from a film made by melt process, and did not cause breakage or destruction of shape, even though both sides of the nonwoven fabrics were individually pinched with fingers and pulled respectively to the opposite direction.

Impact resilience, feeling and degradation in soil of these nonwoven fabrics were measured by the following methods.
① Impact resilience:
Measured in accordance with JIS K-6041.

A specimen having dimensions of 100×100×2 mm and parallel top- and under-surfaces was prepared. A steel ball of ⅝ regular grade specified in JIS B-1501 (ball for ball bearing) was dropped without rotation from a distance 460 mm above the top surface of the specimen, and the maximum rebound distance was measured. Impact resilience was calculated by the formula:

$$R = D_1 \times D_0 \times 100$$

wherein

R is rebound resilience (%), $D_0$ is falling distance 460 (mm), and $D_1$ is rebound distance (mm).
② Feeling:

Nonwoven fabrics obtained were brought into contact with a hand and the touch was classified into the following four groups.

Standard 1: The touch is stiff.

2: The touch is somewhat stiff.

3: The touch is somewhat soft.

4: The tough is soft.
③ Degradation in soil:

A nonwoven fabric having dimensions of 50×50 mm was buried at 35° C. in soil having a moisture content of 30%. After 2 months, change in appearance of the nonwoven fabric was observed.

These results are summarized in Table 6.

Comparative Example 4-1

A nonwoven fabric was prepared by carrying out the same procedures as described in Example 4-1 except that the aliphatic polyester was replaced by high density polyethylene having density of 0.95 g/cm³ and a melt index MI of 1.0 g/10 min, and spinning was conducted at 200° C. Properties of the nonwoven fabric were measured by the same methods as above and results are illustrated in Table 6.

Comparative Example 4-2

A nonwoven fabric was prepared by carrying out the same procedures as described in Example 4-1 except that the aliphatic polyester was replaced by poly-L-lactic acid having an average molecular weight of about 110,000, and spinning was conducted at 180° C. Properties of the nonwoven fabric were measured by the same methods as above and results are illustrated in Table 6.

Example 5-1

A translucent film having thickness of 100 μm was prepared from the polymer which was obtained in Preparation Example 1 and had a weight average molecular weight of 124,000 by hot-pressing at 170° C. for 5 minutes and successively cooling at 40° C. for 5 minutes.

A coated paper having good surface gloss was obtained by superimposing the film thus obtained on a wood free paper of 65.5 g/m² in basis weight and pressing in a hot press at 170° C. for 5 minutes under pressure of 30 kg/cm². The coated paper obtained was flexible. The polymer film exhibited no cracks on 20 folds made by folding one portion upon another portion of the paper. Cracks of the film was confirmed by applying colored water to the surface of the coated paper and checking a color-permeated portion.

When the coated paper was warmed to 60° C. in a 5N aqueous sodium hydroxide solution, the polymer layer on the surface was dissolved and disappeared after 5 hours. When the film was buried in compost at 40° C., the film was completely destructed after 2 weeks.

Example 5-2

A film and a coated paper were prepared by carrying out the same procedures as described in Example 5-1 except that the polymer which was obtained in Preparation Example 2 and had a weight average molecular weight of 118,000 was used and that film forming and pressure adhesion to the paper were carried out at 150° C. A flexible coated paper having good surface glass was obtained. The same folding test as described in Example 5-1 was carried out and no crack was observed on the polymer film.

When the coated paper was warmed to 60° C. in a 5N aqueous sodium hydroxide solution, the polymer layer on the surface was dissolved and disappeared after 5 hours. When the film was buried in compost at 40° C., the film was completely destructed after 2 weeks.

Example 5-3

A film and coated paper were prepared by carrying out the same procedures as described in Example 5-1 except that the polymer which was obtained in Preparation Example 3 and had a weight average molecular weight of 122,000 was used. A flexible coated paper having good surface gloss was obtained. The same folding test as described in Example 5-1 was carried out. No crack was observed on the polymer film.

When the coated paper was warmed to 60° C. in a 5N aqueous sodium hydroxide solution, the polymer layer on the surface was dissolved and disappeared after 5 hours. When the film was buried in compost at 40° C., the film was completely destructed after 2 weeks.

Example 5-4

A film and a coated paper were prepared by carrying out the same procedures as described in Example 5-1 except that the polymer which was obtained in Preparation Example 4 and had a weight average molecular weight of 147,000 was used. A flexible coated paper having good surface gloss was obtained. The same folding test as described in Example 5-1 was carried out. No crack was observed on the polymer film.

When the coated paper was warmed to 60° C. in a 5N aqueous sodium hydroxide solution, the polymer layer on the surface was dissolved and disappeared after 5 hours. When the film was buried in compost at 40° C., the film was completely destructed after 2 weeks.

Example 5-5

A film and a coated paper were prepared by carrying out the same procedures as described in Example 5-1 except that the polymer which was obtained in Preparation Example 5 and had a weight average molecular weight of 137,000 was used. A flexible coated paper having good surface gloss was obtained. The same folding test as described in Example 5-1 was carried out. No crack was observed on the polymer film.

When the coated paper was warmed to 60° C. in a 5N aqueous sodium hydroxide solution, the polymer layer on the surface was dissolved and disappeared after 5 hours. When the film was buried in compost at 40° C. the film was completely destructed after 2 weeks.

Comparative Example 5-1

A film and a coated paper were prepared by carrying out the same procedures as described in Example 5-1 except that poly-L-lactic acid having a weight average molecular weight of 130,000 was used and that film forming and pressure adhesion to the paper were carried out at 200° C. A flexible coated paper having good surface gloss was obtained. The same folding test as described in Example 5-1 was carried out and cracks of polymer film were observed on 2 folds from among 20 folds.

When the coated paper was warmed to 60° C. in a 5N aqueous sodium hydroxide solution, the polymer layer on the surface was dissolved and disappeared after 5 hours. When the film was buried in compost at 40° C., the film was completely destructed after 2 weeks.

Comparative Example 5-2

A film and a coated paper were prepared by carrying out the same procedures as described in Example 5-1 except that polyethylene (Mirason-11) was used as a raw material polymer. A flexible coated paper having good surface gloss was obtained. The same folding test as described in Example 5-1 was carried out. No crack was observed on the polymer film.

When the film was buried in compost at 40° C., no change was observed even after 2 weeks.

Example 5-6

A flexible coated paper was prepared by dissolving the polymer which was obtained in Preparation Example 1 and had a weight average molecular weight of 124,000 in chloroform to a concentration of 5 wt %, applying the solution to a wood free paper having basis weight of 65.5 g/m² and drying the treated paper.

When the coated paper was warmed to 60° C. in a 5N aqueous sodium hydroxide solution, no change was observed on the polymer layer at the surface. When the film was buried in compost at 40° C., no change was observed even after 2 weeks.

Example 5-7

A flexible composite film having good surface gloss was prepared by superimposing the film which was obtained in Example 5-1 and had thickness of 100 μm on a regenerated cellulose film (cellophane) of 50 μm in thickness, and adhering in a hot press at 170° C. for 5 minutes under pressure of 30 kg/cm².

When the composite film was buried in a compost at 40° C., the film was destructed after 2 weeks.

Example 5-8

A composite film having good surface gloss was prepared by superimposing the film which was obtained in Example 5-2 and had thickness of 100 μm on a cellulose acetate film which had an acetylation degree of 40% and thickness of 50 μm, and adhering in a hot press at 150° C. for 5 minutes under pressure of 30 kg/cm². When the composite film was buried in a compost at 40° C., the film was destructed after 2 weeks.

Example 5-9

A composite film having good surface gloss was prepared by superimposing the film which was obtained in Example 5-2 and had thickness of 100 μm on a methyl cellulose film which had a methoxy group content of 29% and thickness of 50 μm, and adhering in a hot press at 150° for 5 minutes under pressure of 30 kg/cm².

When the composite film was warmed to 60° C. in a 5N aqueous sodium hydroxide solution, the film was dissolved and disappeared after 5 hours. When the composite film was buried in a compost at 40° C., the film was destructed after 2 weeks.

Results of the above Examples and Comparative Examples are illustrated in Tables 7 and 8.

Example 6-1

The polymer obtained in Preparation Example 1 was pressed in a hot press at 170° C. for 5 minutes and successively cooled at 40° C. for 5 minutes to obtain a translucent film having thickness of 100 μm. The film had a tensile strength at yield of 220 kg/cm² and elongation at break of 510%.

When the film was warmed to 60° C. in a 5N aqueous sodium hydroxide solution, the film was dissolved and disappeared after 5 hours. When the film was buried in a compost at 40° C., the film was completely destructed after 2 weeks.

Example 6-2

The polymer obtained in Preparation Example 2 was pressed in a hot press at 170° C. for 5 minutes and successively cooled at 40° C. for 5 minutes to obtain a translucent film having thickness of 100 μm. The film had a tensile strength at yield of 250 kg/cm² and elongation at break of 480%.

When the film was warmed to 60° C. in a 5N aqueous sodium hydroxide solution, the film was dissolved and disappeared after 5 hours. When the film was buried in a compost at 40° C., the film was completely destructed after 2 weeks.

Example 6-3

The polymer obtained in Preparation Example 3 was pressed in a hot press at 170° C. for 5 minutes and successively cooled at 40° C. for 5 minutes to obtain a translucent film having thickness of 100 μm. The film had a tensile strength at yield of 270 kg/cm² and elongation at break of 490%.

When the film was warmed to 60° C. in a 5N aqueous sodium hydroxide solution, the film was dissolved and disappeared after 5 hours. When the film was buried in a compost at 40° C., the film was completely destructed after 2 weeks.

Example 6-4

The polymer obtained in Preparation Example 4 was pressed in a hot press at 170° C. for 5 minutes and successively cooled at 40° C. for 5 minutes to obtain a translucent film having thickness of 100 μm. The film had a tensile strength at yield of 200 kg/cm² and elongation at break of 520%.

When the film was warmed to 60° C. in a 5N aqueous sodium hydroxide solution, the film was dissolved and disappeared after 5 hours. When the film was buried in a compost at 40° C., the film was completely destructed after 2 weeks.

Example 6-5

The polymer obtained in Preparation Example 5 was pressed in a hot press at 170° C. for 5 minutes and successively cooled at 40° C. for 5 minutes to obtain a translucent film having thickness of 100 μm. The film had a tensile strength at yield of 210 kg/cm² and elongation at break of 530%.

When the film was warmed to 60° C. in a 5N aqueous sodium hydroxide solution, the film was dissolved and disappeared after 5 hours. When the film was buried in a compost at 40° C., the film was completely destructed after 2 weeks.

Comparative Example 6-1

Polyethylene (Mirason-11) was used in place of aliphatic polyester and pressed in a hot press at 170° C. for 5 minutes and successively cooled at 40° C. for 5 minutes to obtain a translucent film having thickness of 100 μm. The film had a tensile strength at yield of 220 kg/cm² and elongation at break of 500%.

When the film was warmed to 60° C. in a 5N aqueous sodium hydroxide solution, no change was observed on the appearance of film even after 5 hours. When the film was buried in a compost at 40° C., no change was observed on the appearance of film even after 2 weeks.

Comparative Example 6-2

Poly-L-lactic acid having a weight average molecular for weight of 130,000 was used in place of aliphatic polyester and pressed in a hot press at 200° C. for 5 minutes to obtain a translucent film having thickness of 100 μm. The film had a tensile strength at yield of 660 kg/cm² and elongation at break of 5%.

When the film was warmed to 60° C. in a 5N aqueous sodium hydroxide solution, the film was dissolved and disappeared after 5 hours. When the film was buried in a compost at 40° C., the film was completely destructed, after 2 weeks.

Results of the above Examples and Comparative Examples are illustrated in Table 9.

However, these examples are not intended to limit of the scope of the present invention. This may be practiced or embodied in still other ways without departing from the spirit or essential character thereof.

TABLE 1

|  | Example 1-1 | Example 1-2 | Example 1-3 | Example 1-4 | Example 1-5 | Comparative Example 1-1 | Comparative Example 1-2 |
| --- | --- | --- | --- | --- | --- | --- | --- |
| Polymer | P-1 | P-2 | P-3 | P-4 | P-5 | polyethylene | polylactic acid |
| Sheet thickness (mm) | 2.1 | 2.8 | 2.5 | 2.4 | 2.4 | 2.3 | 2.3 |
| Density (g/cc) | 0.10 | 0.13 | 0.13 | 0.11 | 0.10 | 0.11 | 0.11 |

TABLE 1-continued

|  | Example 1-1 | Example 1-2 | Example 1-3 | Example 1-4 | Example 1-5 | Comparative Example 1-1 | Comparative Example 1-2 |
| --- | --- | --- | --- | --- | --- | --- | --- |
| Tensile modulus (kgf/cm$^2$) | 530 | 650 | 720 | 500 | 490 | 400 | 2400 |
| Thermal conductivity (kcal/m. hr. °C.) | 0.04 | 0.04 | 0.04 | 0.04 | 0.04 | 0.04 | 0.04 |
| Degradation in compost (40° C., 2 week) | completely destructed | completely destructed | completely destructed | completely destructed | completely destructed | no change | completely destructed |

TABLE 2

|  | Example 1-6 | Example 1-7 | Comparative Example 1-3 |
| --- | --- | --- | --- |
| Polymer | P-1 | P-1 | polylactic acid |
| Sheet thickness (mm) | 2.4 | 2.5 | 2.3 |
| Density (g/cc) | 0.51 | 0.53 | 0.51 |
| Tensile modulus (kgf/cm$^2$) | 2700 | 2800 | 11000 |
| Thermal conductivity (kcal/m. hr. °C.) | 0.05 | 0.05 | 0.05 |
| Degradation in compost (40° C., 2 week) | completely destructed | completely destructed | completely destructed |

TABLE 3

|  | Example 2-1 | Example 2-2 | Example 2-3 | Example 2-4 | Example 2-5 | Comparative Example 2-1 | Comparative Example 2-2 |
| --- | --- | --- | --- | --- | --- | --- | --- |
| Polymer | P-1 | P-2 | P-3 | P-4 | P-5 | polyethylene | polylactic acid |
| Filament size (denier) | 500 | 500 | 500 | 500 | 500 | 500 | 500 |
| Filament density (void volume %) | 60 | 60 | 60 | 60 | 60 | 60 | 60 |
| Tensile modulus (kgf/cm$^2$) |  |  |  |  |  |  |  |
| longitudinal direction | 6100 | 6400 | 7000 | 5300 | 5200 | 10,000 | 28,000 |
| transverse direction | 5700 | 6100 | 6800 | 5100 | 5000 | 9,600 | 26,000 |
| Elongation at break (%) |  |  |  |  |  |  |  |
| longitudinal direction | 33 | 30 | 28 | 26 | 27 | 28 | 21 |
| transverse direction | 33 | 31 | 29 | 27 | 28 | 28 | 23 |
| Degradation in soil (2 month) appearance | fabric was destructed by weak force | | | | | no change | fabric was destructed by weak force |
| weight loss (%) | 31 | 29 | 30 | 25 | 29 | 0 | 22 |

TABLE 4

|  | Example 2-6 | Example 2-7 | Comparative Example 2-3 |
| --- | --- | --- | --- |
| Polymer | P-1 | P-2 | polylactic acid |
| Filament size (denier) | 250 | 1000 | 1000 |
| Filament density (void volume %) | 70 | 60 | 60 |
| Tensile modulus (kgf/cm$^2$) |  |  |  |
| longitudinal direction | 5800 | 6300 | 30,000 |
| transverse direction | 5500 | 6100 | 28,000 |

TABLE 4-continued

|  | Example 2-6 | Example 2-7 | Comparative Example 2-3 |
| --- | --- | --- | --- |
| Elongation at break (%) |  |  |  |
| longitudinal direction | 27 | 35 | 25 |
| transverse direction | 28 | 34 | 27 |
| Degradation in soil (2 months) appearance | fabric was destructed by weak force | | |
| weight loss (%) | 34 | 31 | 20 |

TABLE 5

|  | Example 3-1 | Example 3-2 | Example 3-3 | Example 3-4 | Example 3-5 |
| --- | --- | --- | --- | --- | --- |
| Polymer | P-1 | P-2 | P-3 | P-4 | P-5 |
| Spinning temperature (°C.) | 120 | 130 | 165 | 100 | 115 |
| Stretching temperature (°C.) | 60 | 65 | 80 | 45 | 60 |
| Stretch ratio | 8.0 | 9.5 | 8.0 | 9.5 | 9.0 |
| Tensile strength (kg/mm$^2$) | 40 | 42 | 45 | 20 | 20 |

TABLE 6

|  | Example 4-1 | Example 4-2 | Example 4-3 | Example 4-4 | Example 4-5 | Comparative Example 4-1 | Comparative Example 4-2 |
|---|---|---|---|---|---|---|---|
| Polymer | P-1 | P-2 | P-3 | P-4 | P-5 | polyethylene | polylactic acid |
| Impact resilience (%) | 15 | 14 | 14 | 15 | 15 | 13 | 7 |
| Feeling | 4 | 4 | 3 | 3 | 4 | 4 | 1 |
| Degradation in soil (2 month) Appearance | fabric was destructed by weak force | | | | | no change | fabric was destructed by weak force |

TABLE 7

|  | Example 5-1 | Example 5-2 | Example 5-3 | Example 5-4 | Example 5-5 | Example 5-6 | Comparative Example 5-1 | Comparative Example 5-2 |
|---|---|---|---|---|---|---|---|---|
| Polymer | P-1 | P-2 | P-3 | P-4 | P-5 | P-1 | P-1 | polyethylene |
| Crack | no | no | no | no | no | no | generated | no |
| Surface polymer layer after 5 N—NaOHaq treatment | dissolved and disappeared | | | | | | | no change |
| Degradation in compost Appearance | completely destructed | | | | | | | no change |

TABLE 8

|  | Example 5-7 | Example 5-8 | Example 5-9 |
|---|---|---|---|
| Polymer | P-3 | P-4 | P-1 |
| Crack | no | no | no |
| Surface polymer layer after 5 N—NaOHaq treatment | dissolved and disappeared | | |
| Degradation in compost Appearance | completely destructed | | |

TABLE 9

|  | Example 6-1 | Example 6-2 | Example 6-3 | Example 6-4 | Example 6-5 | Comparative Example 6-1 | Comparative Example 6-2 |
|---|---|---|---|---|---|---|---|
| Polymer | P-1 | P-2 | P-3 | P-4 | P-5 | polyethylene | polylactic acid |
| Yield strength (kgf/cm$^2$) | 220 | 250 | 270 | 200 | 210 | 220 | 660 |
| Elongation at break (%) | 510 | 480 | 490 | 520 | 530 | 500 | 5 |
| Surface polymer layer after 5 N—NaOHaq treatment | dissolved and disappeared | | | | | no change | dissolved and disappeared |
| Degradation in compost (40° C., 2 week) appearance | completely destructed | | | | | no change | completely destructed |

What is claimed is:

1. A degradable thermoplastic polymer formed product selected from the group consisting of a foam, woven fabric, filament, nonwoven fabric and film, comprising an aliphatic polyester having a weight average molecular weight of 50,000 or more which is obtained by conducting a polycondensation reaction of:

i) at least one aliphatic polyhydric alcohol with at least one aliphatic polybasic acid or ii) at least one aliphatic polyhydric alcohol with at least one aliphatic polybasic acid and at least one hydroxycarboxylic acid or iii) an oligomer resulting from i) or ii) in a reaction mixture comprising an organic solvent.

2. The degradable thermoplastic polymer of claim 1, wherein the filament has a tensile strength of 20 kg/mm$^2$ or more.

3. The degradable thermoplastic polymer of claim 1, wherein the filament is obtained by spinning and successive stretch operation.

4. The degradable thermoplastic polymer of claim 3, wherein the filament has a stretch ratio of 5–25.

* * * * *

UNITED STATES PATENT AND TRADEMARK OFFICE
CERTIFICATE OF CORRECTION

PATENT NO.   : 5,714,230

DATED:       : February 3, 1998

INVENTOR(S)  : Taiji KAMEOKA et al

It is certified that error appears in the above-identified patent and that said Letters Patent is hereby corrected as shown below:

On title page, item [56], the last "Foreign Patent Document" should read as follows:

51-40287      6/93      Japan

Signed and Sealed this

Twenty-ninth Day of December, 1998

Attest:

BRUCE LEHMAN

*Attesting Officer*         Commissioner of Patents and Trademarks